(12) United States Patent
Murai et al.

(10) Patent No.: US 10,274,946 B2
(45) Date of Patent: Apr. 30, 2019

(54) MONITORING CONTROL APPARATUS AND MONITORING CONTROL METHOD

(71) Applicant: Mitsubishi Electric Corporation, Chiyoda-ku (JP)

(72) Inventors: Shuto Murai, Chiyoda-ku (JP); Tsuyoshi Higuchi, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 989 days.

(21) Appl. No.: 14/650,125

(22) PCT Filed: Oct. 4, 2013

(86) PCT No.: PCT/JP2013/005921
§ 371 (c)(1),
(2) Date: Jun. 5, 2015

(87) PCT Pub. No.: WO2014/091653
PCT Pub. Date: Jun. 19, 2014

(65) Prior Publication Data
US 2015/0309507 A1 Oct. 29, 2015

(30) Foreign Application Priority Data
Dec. 12, 2012 (JP) ................................. 2012-270955

(51) Int. Cl.
G06N 7/02 (2006.01)
G06N 7/04 (2006.01)
(Continued)

(52) U.S. Cl.
CPC ................................ G05B 23/0283 (2013.01)

(58) Field of Classification Search
None
See application file for complete search history.

(56) References Cited

U.S. PATENT DOCUMENTS 8,271,412 B2  9/2012 Johnson
2005/0201272 A1* 9/2005 Wang ...................... H04L 45/02
                                                    370/216
(Continued)

FOREIGN PATENT DOCUMENTS

JP   6 176285   6/1994
JP   7 244696   9/1995
(Continued)

OTHER PUBLICATIONS

Extended European Search Report dated Jun. 9, 2016 in Patent Application No. 13862481.2.
(Continued)

Primary Examiner — Scott A. Waldron
Assistant Examiner — Ababacar Seck
(74) Attorney, Agent, or Firm — Oblon, McClelland, Maier & Neustadt, L.L.P.

(57) ABSTRACT

When identifying a maintenance target device that is subject to maintenance in an information system realized by connecting a plurality of devices including a monitoring target device, a maintenance target device identification unit identifies the maintenance target device on the basis of contents of configuration information in the information system or contents of maintenance target device information, and a filtering target device identification unit identifies a filtering target device to be affected by the maintenance of the maintenance target device on the basis of a distance matrix calculated from an adjacency matrix obtained from the configuration information.

17 Claims, 14 Drawing Sheets

(51) Int. Cl.
*G06N 7/06* (2006.01)
*G06N 7/08* (2006.01)
*G05B 23/02* (2006.01)

(56) References Cited

U.S. PATENT DOCUMENTS

| | | | |
|---|---|---|---|
| 2007/0165264 A1* | 7/2007 | Minami | G06F 21/57 |
| | | | 358/1.14 |
| 2008/0294382 A1 | 11/2008 | Lim et al. | |
| 2010/0074125 A1 | 3/2010 | Chandra et al. | |
| 2010/0125683 A1* | 5/2010 | Soeda | G06F 11/3466 |
| | | | 710/19 |

FOREIGN PATENT DOCUMENTS

| | | |
|---|---|---|
| JP | 2002 341930 | 11/2002 |
| JP | 2003 58967 | 2/2003 |
| JP | 2005 84774 | 3/2005 |
| JP | 2007 257581 | 10/2007 |
| JP | 2009 181394 | 8/2009 |
| JP | 2011 198127 | 10/2011 |
| JP | 2012 169956 | 9/2012 |

OTHER PUBLICATIONS

Japanese Office Action dated Aug. 18, 2015 in Japanese Patent Application No. 2014-551838 (with English Translation).
Shuto Murai et al. "The Proposal of Evaluation Method by Matrix in the Surveillance Network Design", Proceedings of the Forum on Information Technology, vol. 11, No. 4, Sep. 4, 2012, pp. 139-140.
International Search Report dated Nov. 5, 2013 in PCT/JP2013/005921 Filed Oct. 4, 2013.

\* cited by examiner

Fig. 3

| Device name | Connected device name |
|---|---|
| Server A | Switch a |
| Server B | Switch b |
| Switch a | Switch c, Switch d |
| Switch b | Switch c, Switch d |
| Switch c | Switch a, Switch b, Switch e |
| Switch d | Switch a, Switch b, Switch e |
| Switch e | Switch c, Switch d |

Fig. 4

|   | A | B | a | b | c | d | e |
|---|---|---|---|---|---|---|---|
| A | — | 0 | 1 | 0 | 0 | 0 | 0 |
| B | 0 | — | 0 | 1 | 0 | 0 | 0 |
| a | 1 | 0 | — | 0 | 1 | 1 | 0 |
| b | 0 | 1 | 0 | — | 1 | 1 | 0 |
| c | 0 | 0 | 1 | 1 | — | 0 | 1 |
| d | 0 | 0 | 1 | 1 | 0 | — | 1 |
| e | 0 | 0 | 0 | 0 | 1 | 1 | — |

| Device name | Connected device name |
|---|---|
| Monitoring apparatus | Switch e |
| Server A | Switch a |
| Server B | Switch b |
| Switch a | Switch c |
| Switch b | Switch d |
| Switch c | Switch a, Switch e |
| Switch d | Switch b, Switch e |
| Switch e | Switch c, Switch d |

Fig. 7

|   | A | B | a | b | c | d | e | P |
|---|---|---|---|---|---|---|---|---|
| A |   | 0 | 1 | 0 | 0 | 0 | 0 | 0 |
| B | 0 |   | 0 | 1 | 0 | 0 | 0 | 0 |
| a | 1 | 0 |   | 0 | 1 | 0 | 0 | 0 |
| b | 0 | 1 | 0 |   | 0 | 1 | 0 | 0 |
| c | 0 | 0 | 1 | 0 |   | 0 | 1 | 0 |
| d | 0 | 0 | 0 | 1 | 0 |   | 1 | 0 |
| e | 0 | 0 | 0 | 0 | 1 | 1 |   | 1 |
| P | 0 | 0 | 0 | 0 | 0 | 0 | 1 |   |

Fig. 8

| Maintenance target device | Filtering target device | Maintenance time |
|---|---|---|
| Switch a | Server B | 2012/09/11 20:00 – 2012/09/12 8:00 |
| — | Server B | 2012/09/18 21:00 – 2012/09/19 8:00 |
| Switch m | Server A | 2012/09/21 20:00 – 2012/09/22 7:00 |

111

|   | A | B | a | b | c | d | e | P |
|---|---|---|---|---|---|---|---|---|
| A |   | 0 | 1 | 0 | 0 | 0 | 0 | 0 |
| B | 0 |   | 0 | 1 | 0 | 0 | 0 | 0 |
| a | 1 | 0 |   | 0 | 1 | 1 | 0 | 0 |
| b | 0 | 1 | 0 |   | 1 | 1 | 0 | 0 |
| c | 0 | 0 | 1 | 1 |   | 0 | 1 | 0 |
| d | 0 | 0 | 1 | 1 | 0 |   | 1 | 0 |
| e | 0 | 0 | 0 | 0 | 1 | 1 |   | 1 |
| P | 0 | 0 | 0 | 0 | 0 | 0 | 1 |   |

113 (top right), 112 (bottom left)

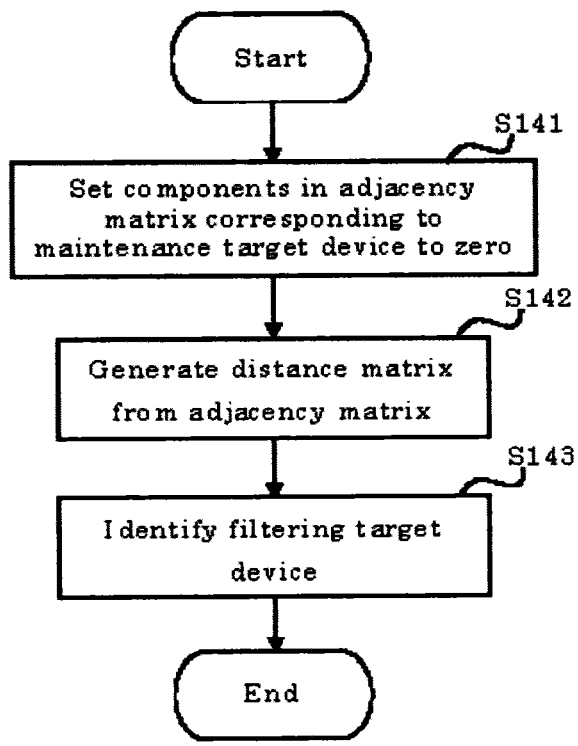

Fig. 15

|   | A | B | a | b | c | d | e | P |
|---|---|---|---|---|---|---|---|---|
| A |   | 0 | 0 | 0 | 0 | 0 | 0 | 0 |
| B | 0 |   | 0 | 1 | 0 | 0 | 0 | 0 |
| a | 0 | 0 |   | 0 | 0 | 0 | 0 | 0 |
| b | 0 | 1 | 0 |   | 0 | 1 | 0 | 0 |
| c | 0 | 0 | 0 | 0 |   | 0 | 1 | 0 |
| d | 0 | 0 | 0 | 1 | 0 |   | 1 | 0 |
| e | 0 | 0 | 0 | 0 | 1 | 1 |   | 1 |
| P | 0 | 0 | 0 | 0 | 0 | 0 | 1 |   |

Fig 16

|   | A | B | a | b | c | d | e | P |
|---|---|---|---|---|---|---|---|---|
| A |   | 0 | 0 | 0 | 0 | 0 | 0 | 0 |
| B | 0 |   | 0 | 1 | 4 | 2 | 3 | 4 |
| a | 0 | 0 |   | 0 | 0 | 0 | 0 | 0 |
| b | 0 | 1 | 0 |   | 3 | 1 | 2 | 3 |
| c | 0 | 4 | 0 | 3 |   | 2 | 1 | 2 |
| d | 0 | 2 | 0 | 1 | 2 |   | 1 | 2 |
| e | 0 | 3 | 0 | 2 | 1 | 1 |   | 1 |
| P | 0 | 4 | 0 | 3 | 2 | 2 | 1 |   |

Fig. 17

|   | A | B | x | e | P |
|---|---|---|---|---|---|
| A |   | 0 | 0 | 0 | 0 |
| B | 0 |   | 0 | 0 | 0 |
| x | 0 | 0 |   | 0 | 0 |
| e | 0 | 0 | 0 |   | 1 |
| P | 0 | 0 | 0 | 1 |   |

Fig. 18

|   | A | B | x | e | P |
|---|---|---|---|---|---|
| A |   | 0 | 0 | 0 | 0 |
| B | 0 |   | 0 | 0 | 0 |
| x | 0 | 0 |   | 0 | 0 |
| e | 0 | 0 | 0 |   | 1 |
| P | 0 | 0 | 0 | 1 |   |

| Maintenance target device | Filtering target device | Maintenance time |
|---|---|---|
| Switch a | Server B, Server A | 2012/09/11 20:00 – 2012/09/12 8:00 |
| — | Server B, Server A | 2012/09/18 21:00 – 2012/09/19 8:00 |
| Switch m | Server A, Server B | 2012/09/21 20:00 – 2012/09/22 7:00 |

|   | A | B | C | D | x | e | f | g | h | P |
|---|---|---|---|---|---|---|---|---|---|---|
| A |   | 0 | 0 | 0 | 1 | 0 | 0 | 0 | 0 | 0 |
| B | 0 |   | 0 | 0 | 1 | 0 | 0 | 0 | 0 | 0 |
| C | 0 | 0 |   | 0 | 0 | 0 | 1 | 0 | 0 | 0 |
| D | 0 | 0 | 0 |   | 0 | 0 | 0 | 1 | 0 | 0 |
| x | 1 | 1 | 0 | 0 |   | 1 | 0 | 0 | 0 | 0 |
| e | 0 | 0 | 0 | 0 | 1 |   | 0 | 0 | 0 | 1 |
| f | 0 | 0 | 1 | 0 | 0 | 0 |   | 0 | 1 | 0 |
| g | 0 | 0 | 0 | 1 | 0 | 0 | 0 |   | 1 | 0 |
| h | 0 | 0 | 0 | 0 | 0 | 0 | 1 | 1 |   | 1 |
| P | 0 | 0 | 0 | 0 | 0 | 1 | 0 | 0 | 1 |   |

|   | A | B | C | D | x | e | f | g | h | P |
|---|---|---|---|---|---|---|---|---|---|---|
| A |   | 0 | 0 | 0 | 0 | 0 | 0 | 0 | 0 | 0 |
| B | 0 |   | 0 | 0 | 0 | 0 | 0 | 0 | 0 | 0 |
| C | 0 | 0 |   | 4 | 0 | 4 | 1 | 3 | 2 | 3 |
| D | 0 | 0 | 4 |   | 0 | 4 | 3 | 1 | 2 | 3 |
| x | 0 | 0 | 0 | 0 |   | 0 | 0 | 0 | 0 | 0 |
| e | 0 | 0 | 4 | 4 | 0 |   | 3 | 3 | 2 | 1 |
| f | 0 | 0 | 1 | 3 | 0 | 3 |   | 2 | 1 | 2 |
| g | 0 | 0 | 3 | 1 | 0 | 3 | 2 |   | 1 | 2 |
| h | 0 | 0 | 2 | 2 | 0 | 2 | 1 | 1 |   | 1 |
| P | 0 | 0 | 3 | 3 | 0 | 1 | 2 | 2 | 1 |   |

|   | A | B | C | D | x1 | e | x2 | h | P |
|---|---|---|---|---|----|---|----|---|---|
| A |   | 0 | 0 | 0 | 1  | 0 | 0  | 0 | 0 |
| B | 0 |   | 0 | 0 | 1  | 0 | 0  | 0 | 0 |
| C | 0 | 0 |   | 0 | 0  | 0 | 1  | 0 | 0 |
| D | 0 | 0 | 0 |   | 0  | 0 | 1  | 0 | 0 |
| x1| 1 | 1 | 0 | 0 |    | 1 | 0  | 0 | 0 |
| e | 0 | 0 | 0 | 0 | 1  |   | 0  | 0 | 1 |
| x2| 0 | 0 | 1 | 1 | 0  | 0 |    | 1 | 0 |
| h | 0 | 0 | 0 | 0 | 0  | 0 | 1  |   | 1 |
| P | 0 | 0 | 0 | 0 | 0  | 1 | 0  | 1 |   |

Fig. 25

|   | A | B | C | D | x1 | e | x2 | h | P |
|---|---|---|---|---|----|---|----|---|---|
| A |   | 0 | 0 | 0 | 0  | 0 | 0  | 0 | 0 |
| B | 0 |   | 0 | 0 | 0  | 0 | 0  | 0 | 0 |
| C | 0 | 0 |   | 0 | 0  | 0 | 0  | 0 | 0 |
| D | 0 | 0 | 0 |   | 0  | 0 | 0  | 0 | 0 |
| x1| 0 | 0 | 0 | 0 |    | 0 | 0  | 0 | 0 |
| e | 0 | 0 | 0 | 0 | 0  |   | 0  | 2 | 1 |
| x2| 0 | 0 | 0 | 0 | 0  | 0 |    | 0 | 0 |
| h | 0 | 0 | 0 | 0 | 0  | 2 | 0  |   | 1 |
| P | 0 | 0 | 0 | 0 | 0  | 1 | 0  | 1 |   |

MONITORING CONTROL APPARATUS AND MONITORING CONTROL METHOD

TECHNICAL FIELD

The invention relates to a monitoring control apparatus that monitors and controls an information system.

BACKGROUND ART

In a system that is configured with a plurality of devices, a halt or a malfunction in one of the devices affects other devices. Therefore, the system performs control by monitoring whether the devices are working normally or by recognizing halt information on the devices in advance so that the other devices are not affected.

Conventionally, on the basis of configuration information and dependency relation of the devices, a decision is made on whether a device in which an error has been generated is generating the error affected by a failed device. By identifying a device that is actually failing and a failed portion of the device, effects on other devices are recognized (refer to Patent Document 1 stated below).

Further, by recognizing maintenance target devices and their maintenance time, whether an alarm is generated owing to maintenance is distinguished so that an unnecessary alarm is not generated (refer to Patent Document 2 stated below).

PRIOR ART DOCUMENT

Patent Document

Patent Document 1: Japanese Unexamined Patent Publication No. 2007-257581
Patent Document 2: Japanese Unexamined Patent Publication No. H07-244696

SUMMARY OF THE INVENTION

Problems to be Solved by the Invention

However, it is not always true that a monitoring apparatus recognizes an entire system configuration. For example, a service provider that monitors a client system recognizes monitoring target devices, but it is not always true that the service provider recognizes the entire system configuration. In Patent Document 1, if the configuration information and the dependency relation of the devices are not recognized, a range of effects on other devices cannot be recognized. Further, in Patent Document 2, if maintenance target devices and their maintenance time are not recognized, whether or not an alarm is generated owing to the maintenance cannot be distinguished.

The present invention has been made to solve the problems described above and an object thereof is to obtain a monitoring control apparatus that identifies a device to be affected by maintenance.

Means for Solving the Problems

When identifying a maintenance target device that is subject to maintenance in an information system realized by connecting a plurality of devices including a monitoring target device, a maintenance target device identification unit identifies the maintenance target device on the basis of contents of configuration information in the information system or contents of maintenance target device information, and a filtering target device identification unit identifies a filtering target device to be affected by the maintenance of the maintenance target device on the basis of a distance matrix calculated from an adjacency matrix obtained from the configuration information.

Effect of the Invention

According to the present invention, devices to be affected by maintenance can be identified even if a monitoring control apparatus does not recognize an entire system configuration.

BRIEF DESCRIPTION OF THE DRAWING(S)

FIG. 1 is a block diagram showing a configuration of a monitoring control apparatus according to Embodiment 1;
FIG. 2 is a diagram showing an overall configuration according to Embodiment 1;
FIG. 3 is a diagram showing a configuration information management table that is maintained in a configuration information management unit according to Embodiment 1;
FIG. 4 is a diagram showing an adjacency matrix generated from real configuration information on an information system according to Embodiment 1;
FIG. 5 is a diagram showing a monitoring configuration of the information system maintained by a monitoring configuration information management unit according to Embodiment 1;
FIG. 6 is a diagram showing a monitoring configuration information management table maintained by the monitoring configuration information management unit according to Embodiment 1;
FIG. 7 is a diagram showing an adjacency matrix generated from the monitoring configuration of the information system according to Embodiment 1;
FIG. 8 is a diagram showing a maintenance information management table maintained in a maintenance information management unit according to Embodiment 1;
FIG. 9 is a flowchart showing a processing flow of the monitoring control apparatus according to Embodiment 1;
FIG. 10 is a flowchart showing a processing flow of a maintenance device identification unit according to Embodiment 1;
FIG. 11 is a diagram showing an adjacency matrix in which a monitoring apparatus is added to the adjacency matrix according to Embodiment 1;
FIG. 12 is a diagram showing a monitoring configuration including a switch group x according to Embodiment 1;
FIG. 13 is a diagram showing an adjacency matrix for the monitoring configuration including the switch group x according to Embodiment 1;
FIG. 14 is a flowchart showing a processing flow of a filtering target identification unit according to Embodiment 1;
FIG. 15 is a diagram showing an adjacency matrix in which component values of the adjacency matrix corresponding to a switch a are set to zero according to Embodiment 1;
FIG. 16 is a diagram showing a distance matrix determined from the adjacency matrix according to Embodiment 1;
FIG. 17 is a diagram showing an adjacency matrix in which component values corresponding to the switch group x in the adjacency matrix are set to zero according to Embodiment 1;

FIG. 18 is a diagram showing a distance matrix determined from the adjacency matrix according to Embodiment 1;

FIG. 21 is a diagram showing an adjacency matrix for the monitoring configuration including the switch group x according to Embodiment 1;

FIG. 22 is a diagram showing a distance matrix determined from the adjacency matrix according to Embodiment 1;

FIG. 24 is a diagram showing an adjacency matrix for the monitoring configuration including the switch group x1 and the switch group x2 according to Embodiment 1; and FIG. 25 is a diagram showing a distance matrix determined from the adjacency matrix according to Embodiment 1.

MODES FOR CARRYING OUT THE INVENTION

Embodiment 1

Figure 1:
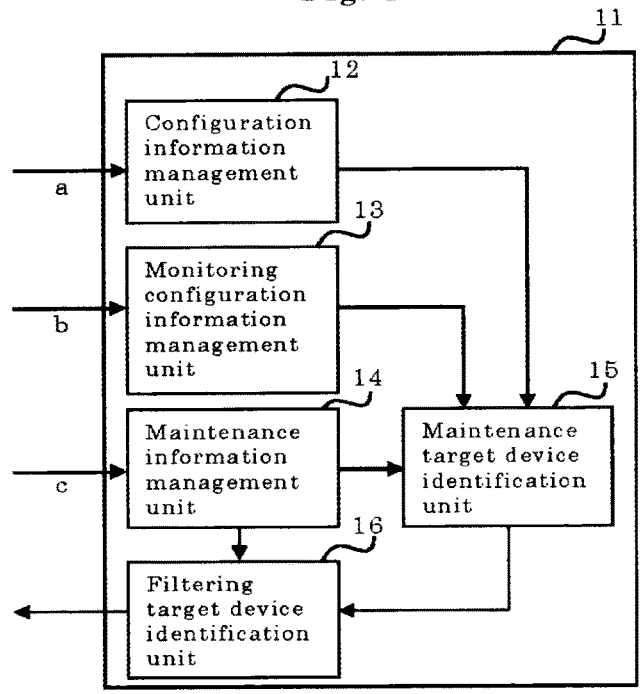

FIG. 1 is a block diagram showing a configuration of a monitoring control apparatus 11 according to Embodiment 1. The monitoring control apparatus 11 is configured with a configuration information management unit 12, a monitoring configuration information management unit 13, a maintenance information management unit 14, a maintenance target device identification unit 15, and a filtering target device identification unit 16.

The configuration information management unit 12 receives real configuration information a that indicates a real configuration of an information system including monitoring target devices. The real configuration information may be input to the configuration information management unit 12 from the information system via a communication line or the real configuration information may be input to the configuration information management unit 12 by a person, and both ways may also be used. The configuration information management unit 12 maintains inputted real configuration information, generates an adjacency matrix from the real configuration information, and outputs the matrix to the maintenance target device identification unit 15. Note that there may be a case where the real configuration information is not input to the configuration information management unit 12.

In addition, the real configuration information includes devices that physically exist, such as servers and network devices, or device layout information (a rack position and location), and does not cover a plurality of virtual machines etc. that can be operated on a server. Further, the configuration information management unit 12 may provide a screen on which a visualized result of a configuration and setting of the information system are outputted on the basis of the inputted real configuration information.

The monitoring configuration information management unit 13 receives monitoring configuration information b. The monitoring configuration information is configuration information on the information system for monitoring, including a monitoring apparatus. The monitoring configuration information is configuration information being input as necessary information for monitoring the monitoring target devices and may differ from the real configuration information. The monitoring configuration information management unit 13 maintains inputted monitoring configuration information, generates an adjacency matrix from the monitoring configuration information, and outputs the matrix to the maintenance target device identification unit 15.

The maintenance information management unit 14 receives maintenance information c on the information system including the monitoring target devices. The maintenance information includes the maintenance target devices, filtering target devices, and maintenance time. Note that there may be a case where the maintenance target devices are unknown. The maintenance information management unit 14 maintains inputted maintenance information and outputs the information to the maintenance target device identification unit 15 and the filtering target device identification unit 16.

The maintenance target device identification unit 15 sets the real configuration information as the configuration information when the real configuration information is input from the configuration information management unit 12. The maintenance target device identification unit 15 sets the monitoring configuration information input from the monitoring configuration information management unit 13 as the configuration information when the real configuration information is not input from the configuration information management unit 12. The maintenance target device identification unit 15 pinpoints the location of the maintenance target devices in the configuration information. The pinpointed maintenance target devices are output to the maintenance target device identification unit 15.

The filtering target device identification unit 16 identifies filtering target devices that are to be affected by the maintenance. The filtering target device identification unit 16 merges the identified filtering target devices into the filtering target devices in the maintenance information and outputs the maintenance information to the monitoring apparatus. Note that the monitoring control apparatus 11 may include a plurality of apparatus.

Next, each of the units will be described in detail. In the following description, a switch indicates a network switch.

Figure 2:
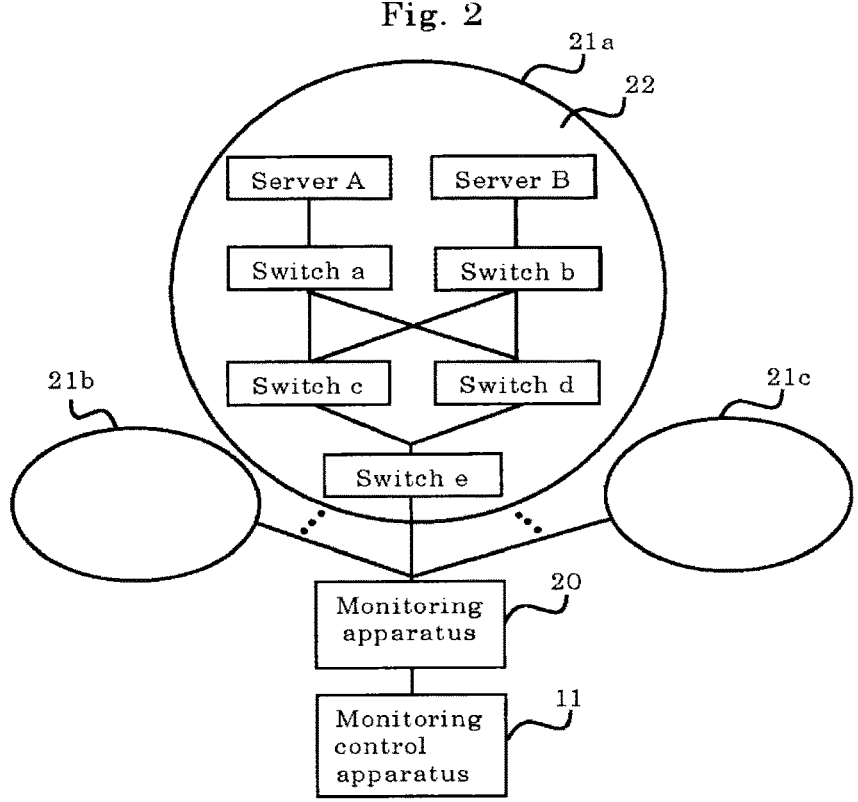

FIG. 2 is a diagram showing an overall configuration according to Embodiment 1. The monitoring control apparatus 11 connects with a monitoring apparatus 20. The monitoring apparatus 20 connects with a plurality of information systems including information systems 21a to 21c. The information systems 21a to 21c are information systems including the monitoring target devices. The monitoring apparatus 20 monitors one or more information systems. Although it is shown in FIG. 2 that the monitoring apparatus 20 connects with information systems 21a to 21c, it may be configured such that one monitoring apparatus connects with each of the information systems 21a to 21c and a plurality of monitoring apparatus connects with the monitoring control apparatus 11.

The information system 21a includes servers 23 and switches 24. Hereinafter, reference numerals for each of the servers 23 and the switches 24 are omitted. A server A connects with a switch a. The switch a connects with a switch c and a switch d. A server B connects with the switch b. The switch b connects with the switch c and the switch d. The switch c and the switch d connect with a switch e. For convenience of explanation in the present embodiment, the configuration of the information system 21a is small-scaled, but in reality, the configuration may frequently be larger-scaled. It is set that the configuration of the information system 21a is a real configuration 22.

FIG. 3 is a diagram showing a real configuration information management table 31 that is maintained in the configuration information management unit 12 according to Embodiment 1. The real configuration information management table 31, regarding the real configuration 21, stores in association with each other, a device name 32 and a connected device name 33 that is connected to the corresponding device. For example, in the first row of the real configuration information management table 31, the device name 32 is the server A and the connected device name 33 is the switch a. This indicates that the server A connects with the switch a.

FIG. 4 is a diagram showing an adjacency matrix 41 generated from the real configuration information on the information system according to Embodiment 1. The leftmost items 42 and the uppermost items 43 of the adjacency matrix 41 indicate device names. A represents the server A, B the server B, a the switch a, b the switch b, c the switch c, d the switch d, and e the switch e.

If a component of the adjacency matrix 41 is one, a device indicated by the item 42 of that row connects with a device indicated by the item 43 of that column. Further, if a component of the adjacency matrix is zero, a device indicated by the item 42 of that row does not connect with a device indicated by the item 43 of that column. In addition, diagonal components of the adjacency matrix 41 are all void. In the first row, for example, only (1, 3) component is one and components in the other columns are all zero. This means that the server A connects with the switch a and is not connected with the other devices.

The configuration information management unit 12 stores the device name 32 and the connected device name 33 in the real configuration information management table 31 in association with each other on the basis of the inputted real configuration information. Further, the configuration information management unit 12 generates the adjacency matrix 41 from the inputted real configuration information and outputs the matrix to the maintenance target device identification unit 15.

Figures 5, 6:
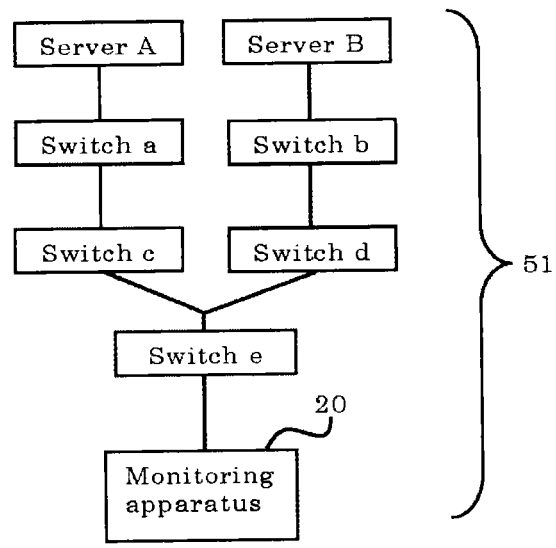

FIG. 5 is a diagram showing a monitoring configuration 51 of an information system maintained by the monitoring configuration information management unit 13 according to Embodiment 1. The server A connects with the switch a. The switch a connects with the switch c. The server B connects with the switch b. The switch b connects with the switch d. The switch c and the switch d connect with the switch e. The switch e connects with the monitoring apparatus 20. The server A and the server B are the monitoring target devices.

FIG. 5 shows the monitoring configuration 51 of the information system recognized by the monitoring configuration information management unit 13 on the basis of the inputted monitoring configuration information. The monitoring configuration 51 differs from the real configuration 22. This is because the monitoring configuration 51 of the information system recognized by the monitoring configuration information management unit 13 is not necessarily the same as the real configuration 22. There may also be a case where the monitoring configuration 51 of the information system recognized by the monitoring configuration information management unit 13 is identical with the real configuration 22.

FIG. 6 is a diagram showing a monitoring configuration information management table 61 maintained by the monitoring configuration information management unit 13 according to Embodiment 1. The monitoring configuration information management table 61, regarding the monitoring configuration 51 of the information system recognized by the monitoring configuration information management unit 13, stores in association with each other, a device name 62 and a connected device name 63 that is connected to the corresponding device. In the first row of the monitoring configuration information management table 61, for example, the device name 62 is the monitoring apparatus and the connected device name 63 is the switch e. This indicates that the monitoring apparatus connects with the switch e.

FIG. 7 is a diagram showing an adjacency matrix 71 generated from the monitoring configuration 51 of the information system according to Embodiment 1. The leftmost items 72 and the uppermost items 73 of the adjacency matrix 71 indicate device names. A represents the server A, B the server B, a the switch a, b the switch b, c the switch c, d the switch d, e the switch e, and P the monitoring apparatus 20. In the 8th row, for example, (8, 7) component is one and the components of the other columns are all zero. This indicates that the monitoring apparatus 20 connects with the switch e and is not connected to the other devices.

On the basis of the inputted monitoring configuration information, the monitoring configuration information management unit 13 stores the device names 32 and the connected device names in association with each other in the monitoring configuration information management table 61.

Furthermore, the monitoring configuration information management unit 13 generates the adjacency matrix 71 from the inputted monitoring configuration information and outputs the matrix to the maintenance device determination unit 17.

FIG. 8 is a diagram showing a maintenance information management table 81 maintained in the maintenance information management unit 14 according to Embodiment 1. The maintenance information management table 81 includes a maintenance target device 82, filtering target device information 83, and maintenance time 84. The maintenance target device 82 indicates a device to be maintained. The filtering target device 83 indicates a device that is possibly affected in some way by the maintenance. The maintenance time 84 indicates a starting time and an ending time of the filtering. Maintenance information 85a is in the first row, maintenance information 85b is in the second row, and maintenance information 85c is in the third row of the maintenance information management table 81.

For example, the maintenance information 85a indicates that the maintenance target device 82 is the switch a, the filtering target device 83 is the server B, and the maintenance time 84 is from Sep. 11, 2012, 20:00 until Sep. 12, 2012, 8:00. The maintenance information management unit 14 stores the inputted maintenance information in the maintenance information management table 81. Note that the maintenance means that a device stops owing to an operation such as replacement of the device or software update.

Figure 9:
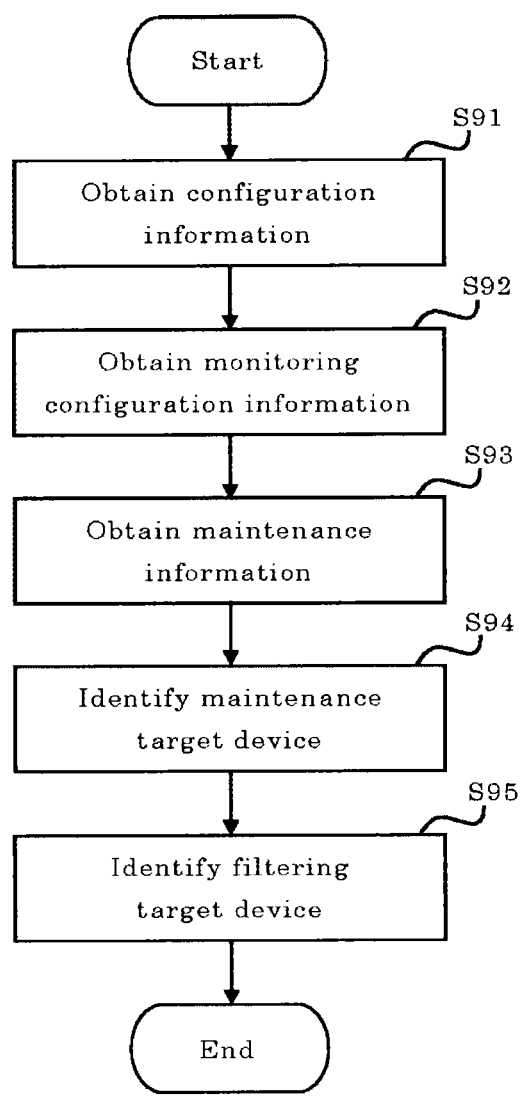

Next, an operation will be described. FIG. 9 is a flowchart showing a processing flow of the monitoring control apparatus 11 according to Embodiment 1. The monitoring control apparatus 11 starts processing from Step S91. In Step S91, real configuration information on an information system including monitoring target devices is input to the configuration information management unit 12. On the basis of the inputted real configuration information, the configuration information management unit 12 generates the real configuration information management table 31 and the adjacency matrix 41. The configuration information management unit 12 outputs the adjacency matrix 41 to the maintenance target device identification unit 15. If the real configuration information on the information system is not input, the configuration information management unit 12 does not perform any processing. The processing proceeds to Step S92.

In Step S92, on the basis of inputted monitoring configuration information, the monitoring configuration information management unit 13 generates the monitoring configuration information management table 61 and the adjacency matrix 71. The monitoring configuration information management unit 13 outputs the adjacency matrix 71 to the maintenance target device identification unit 15. The processing proceeds to Step S93.

In Step S93, the maintenance information management unit 14 generates the maintenance information management table 81 from the inputted maintenance information. The maintenance information management unit 14 outputs the maintenance information management table 81 to the maintenance target device identification unit 15 and the filtering target device identification unit 16. The processing proceeds to Step S94.

In Step S94, the maintenance target device identification unit 15 refers to the maintenance target device 82 in the maintenance information management table 81. The maintenance target device identification unit 15 identifies a maintenance target device in the real configuration 22 or the monitoring configuration 51. The maintenance target device identification unit 15 outputs an adjacency matrix for the configuration including the identified maintenance target device to the filtering target device identification unit 16, and then the processing proceeds to Step S95. The detail of Step S94 will be described later.

In Step S95 the filtering target device identification unit 16 identifies a filtering target device from the adjacency matrix for the configuration including the maintenance target device, and then the processing is terminated. The detail of the Step S95 will be described later. Note that the monitoring control apparatus 11 performs processing of Step S94 and Step S95 for the maintenance target devices 82 in all the rows stored in the maintenance information management table 81.

Figure 10:
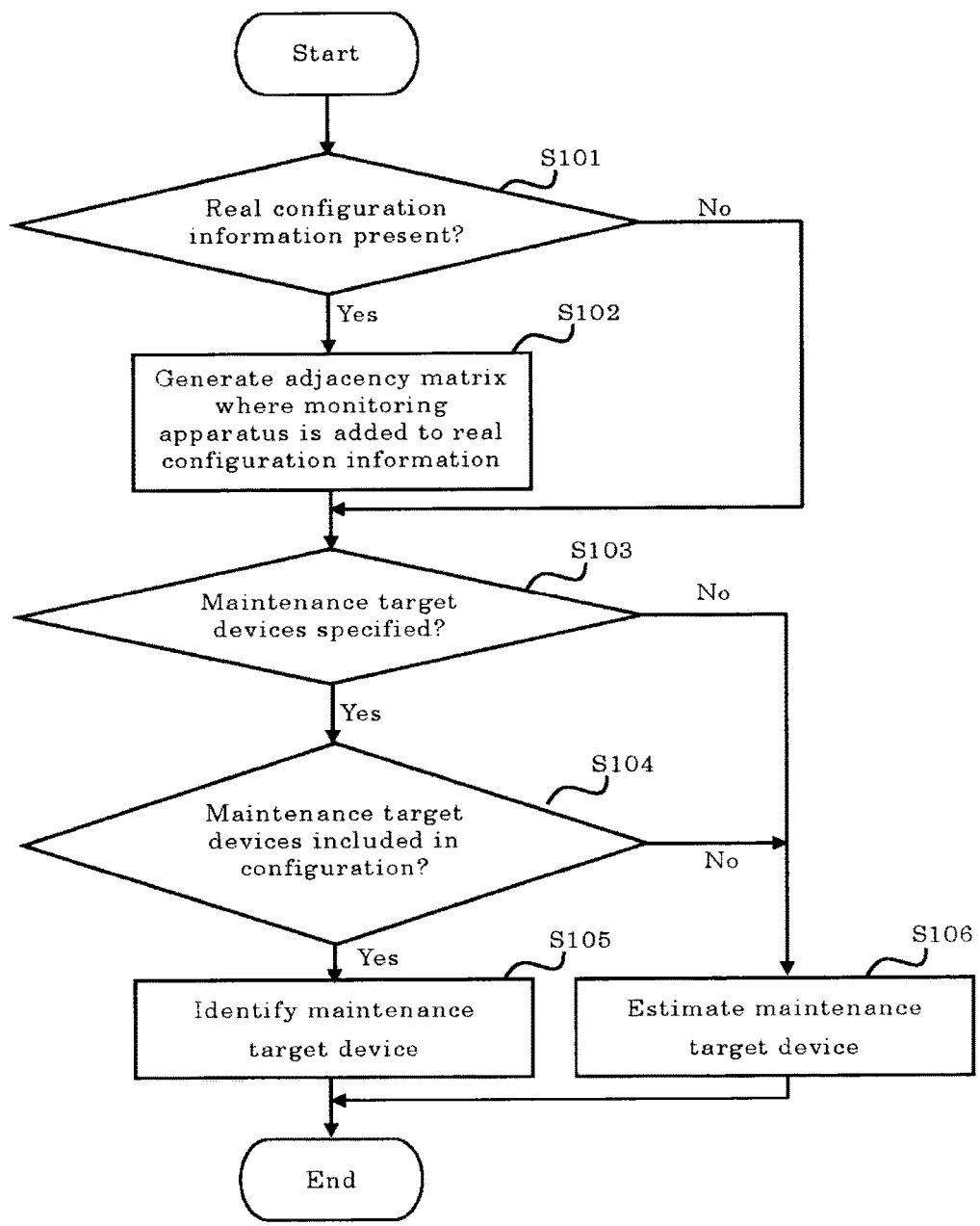

FIG. 10 is a flowchart showing a processing flow of the maintenance target device identification unit 15 according to Embodiment 1. The flowchart of FIG. 10 shows in detail the processing of Step S94 in FIG. 9. The maintenance target device identification unit 15 starts processing from Step S101.

In Step S101, if the adjacency matrix 41 for the real configuration has been input, the processing of the maintenance target device identification unit 15 proceeds to Step S102. If the adjacency matrix 41 for the real configuration 22 has not been input, the processing proceeds to Step S103. In Step S102, the maintenance target device identification unit 15 generates an adjacency matrix for the configuration where the monitoring apparatus 20 is added in the adjacency matrix 41 for the real configuration 22.

Figures 11, 12:
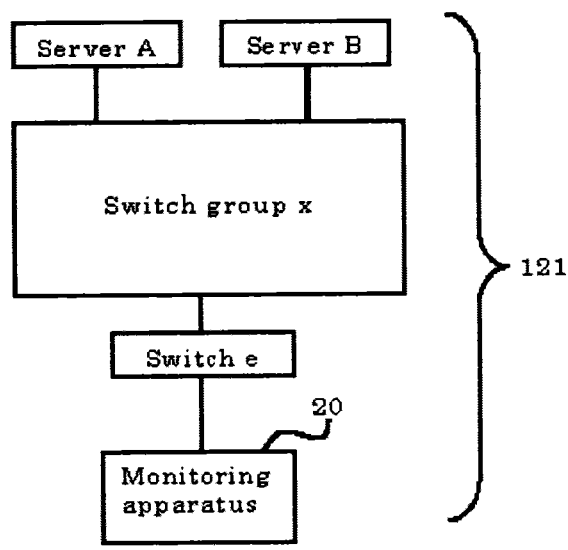

FIG. 11 is a diagram showing an adjacency matrix 111 in which the monitoring apparatus 20 is added in the adjacency matrix 41 according to Embodiment 1. The adjacency matrix 111 is a matrix in which the eighth row and the eighth column are added to the adjacency matrix 41. The leftmost items 112 and the uppermost items 113 of the adjacency matrix 111 indicate device names. A represents the server A, B the server B, a the switch a, b the switch b, c the switch c, d the switch d, e the switch e, and P the monitoring apparatus 20.

In the processing after Step S103, the maintenance target device identification unit 15 uses the adjacency matrix 111 as an adjacency matrix if the adjacency matrix 41 for the real configuration 22 has been input. The maintenance target device identification unit 15 uses the adjacency matrix 71 for the monitoring configuration 51 as an adjacency matrix if the adjacency matrix 41 for the real configuration 22 has not been input. In the present embodiment, a case will be explained as an example in which the adjacency matrix 41 for the real configuration 22 has not been input and the adjacency matrix 71 for the monitoring configuration 51 is used as an adjacency matrix.

In Step S103, the maintenance target device identification unit 15 refers to the maintenance information maintained in the maintenance information management table 81. If a maintenance target device name is specified, the processing proceeds to Step S104. If a maintenance target device name is not specified, the processing proceeds to Step S106.

In Step S104, the maintenance target device identification unit 15 refers to the adjacency matrix 71. If the specified maintenance target device is included in the adjacency matrix 71, the processing proceeds to Step S105. If the specified maintenance target device is not included in the adjacency matrix 71, the processing proceeds to Step S106.

In Step S105, the maintenance target device identification unit 15 identifies the maintenance target device name specified in the maintenance information management table 81 as a maintenance target device, and then the processing is terminated.

The following Step S106 is a case where configuration information on an information system can be recognized to some extent, but which device is to be maintained is unknown or a maintenance device is not included in the configuration. A method will be described in which, even in such a case, filtering target devices are to be identified after maintenance target devices are estimated.

In Step S106 of FIG. 10, the maintenance target device identification unit 15 estimates that maintenance target devices exist between a monitoring target device and a device connecting with the monitoring apparatus 20, and generates an adjacency matrix in which devices connected between them are defined as a switch group x. FIG. 12 is a diagram showing a monitoring configuration 121 including the switch group x according to Embodiment 1. The monitoring configuration 121 is a configuration in which a plurality of devices between the switch e, and the server A and the server B are defined as the switch group x in the monitoring configuration 51.

FIG. 13 is a diagram showing an adjacency matrix 131 for the monitoring configuration 121 including the switch group x according to Embodiment 1. In the adjacency matrix 131, the leftmost items 132 and the uppermost items 133 of the adjacency matrix 131 indicate device names. A of the device name represents the server A, B the server B, x the switch group x, and P the monitoring apparatus 20.

The monitoring target devices are the server A and the server B. The maintenance target device identification unit 15 identifies the maintenance target devices as the switch group x and generates an adjacency matrix 131 for the monitoring configuration 121 including the switch group x, and then the processing is terminated. Note that, if any information by which a range of switch group x can be confined is available, the range of switch group x may be confined using the information. In FIG. 12, it is assumed that the maintenance target device identification unit 15 recognizes that the monitoring apparatus 20 only connects with the switch e and is not connected to the other devices. The switch group x is a device group including a plurality of devices.

Here, the processing of Step S103 to S106 in FIG. 10 will be described by taking an example of the maintenance information 85a to 85c stored in the maintenance management table 81. The maintenance information 85a indicates that a maintenance target device is the switch a. In Step S103, since the maintenance target device is stated, the processing of the maintenance target device identification unit 15 proceeds to Step S104. In Step S104, since the switch a is included in the configuration that the adjacency matrix 71 indicates, the processing of the maintenance target device identification unit 15 proceeds to Step S105. In Step S105, the maintenance target device identification unit 15 identifies the maintenance target device as the switch a, and the processing is terminated.

The maintenance information 85b indicates that a maintenance target device is unknown. In Step S103, since a maintenance target device is not stated, the processing of the maintenance target device identification unit 15 proceeds to Step S106. In Step S106, the maintenance target device identification unit 15 estimates that maintenance target devices exist between the switch e connecting with the monitoring apparatus 20 and the monitoring target devices that are the server A and the server B, and defines the devices connected between them as a switch group x. In Step S106, the maintenance target device identification unit 15 identifies the maintenance target devices as the switch group x and generates the adjacency matrix 131 for the monitoring configuration 121 including the switch group x, and then the processing is terminated.

The maintenance information 85c indicates that a maintenance target device is a switch m. In Step S103, since the maintenance target device is stated, the processing of the maintenance target device identification unit 15 proceeds to Step S104. In Step S104, since the switch in is not included in the configuration that the adjacency matrix 71 indicates, the processing of the maintenance target device identification unit 15 proceeds to Step S106.

In Step S106, the processing of the maintenance target device identification unit 15 estimates that maintenance target devices exist between the switch e connecting with the monitoring apparatus 20 and the monitoring target devices that are the server A and the server B, and defines the devices connected between them as the switch group x. The monitoring configuration is indicated by numeral 121. In Step S106, the maintenance target device identification unit 15 identifies the maintenance target devices as the switch group x and generates the adjacency matrix 131 for the monitoring configuration 121 including the switch group x, and then the processing is terminated.

FIG. 14 is a flowchart showing a processing flow of the filtering target device identification unit 16 according to Embodiment 1. The flowchart of FIG. 14 shows in detail the processing of Step S95 in FIG. 9. FIG. 15 is a diagram showing an adjacency matrix 151 in which component values corresponding to the switch a in the adjacency matrix 71 according to Embodiment 1 are set to zero. The leftmost items 152 and the uppermost items 153 of the adjacency matrix 151 indicate device names. A represents the server A, B the server B, a the switch a, b the switch b, c the switch c, d the switch d, e the switch e, and P the monitoring apparatus 20. In the adjacency matrix 151, components corresponding to the switch a are the shaded components.

Next, processing of the filtering target device identification unit 16 will be explained by taking an example of the maintenance information 85a. The maintenance target device is the switch a and the filtering target device is the server B. The monitoring configuration 51 is considered as a configuration, and the adjacency matrix 71 is used. The filtering target device identification unit 16 starts the processing from Step S141. In Step S141, the filtering target device identification unit 16 sets to zero, the components corresponding to the switch a being the maintenance target device in the adjacency matrix 71. The adjacency matrix results in the matrix indicated by numeral 151. The reason why the components are set to zero is because the switch a being the maintenance target device does not connect with neighboring devices owing to the maintenance. The processing proceeds to Step S142. In Step S142, the filtering target device identification unit 16 calculates a distance matrix from the adjacency matrix 151.

FIG. 16 is a diagram showing a distance matrix 161 determined from the adjacency matrix 151 according to Embodiment 1. The leftmost items 162 and the uppermost items 163 of the distance matrix 161 indicate device names. A represents the server A, B the server B, a the switch a, b the switch b, c the switch c, d the switch d, e the switch e, and P the monitoring apparatus 20.

Each of the components in the distance matrix 161 indicates a distance between two devices. If two devices are adjacent, the distance is one. For example, the distance from the monitoring apparatus 20 to the switch b is indicated by the component (8, 4) of the distance matrix 161, having a value of three. Referring to the monitoring configuration 51, the monitoring apparatus connects with the switch b via the switch e and the switch d, which means that the distance is three. The diagonal component values of the distance matrix 161 are void.

A calculation method for the distance matrix 161 will be described. If a value of a component in the adjacency matrix 151 is one, a value of that component in the distance matrix 161 is set to one. Assuming the diagonal components of the adjacency matrix 151 to be zero, the filtering target device identification unit 16 calculates the distance matrix 161. First, the adjacency matrix 151 is squared and if a value of a component changes from zero to one, the value of the component in the distance matrix 161 is set to two. Next, the adjacency matrix 151 is cubed and if a component value changes from zero to one, the component value in the distance matrix 161 is set to three. In the same way, components equal to and larger than four are calculated in order and all the components in the distance matrix 161 can be determined.

The processing proceeds to Step S143. In Step S143, the filtering target device identification unit 16 refers to the determined distance matrix 161. If there is a device whose all corresponding components are zero other than the maintenance target device, i.e., switch a, the device is added to the maintenance information as a filtering target device. However, if the device is already included in the filtering target devices in the maintenance information, the device is not added. In the distance matrix 161, the components corresponding to the server A are all zero. It is understood that the server A cannot connect with other devices owing to the maintenance of the switch a. The filtering target device identification unit 16 identifies that the server A is a filtering target device.

Since the filtering target device in the maintenance information 85a is the server B, the filtering target device identification unit 16 adds the server A to the maintenance information, and then the processing is terminated.

Next, processing of the filtering target device identification unit 16 will be described by taking an example of the maintenance information 85b. The maintenance target device is unknown and the switch group x is identified as the maintenance target device in the maintenance target device identification unit 15. The filtering target device is the server B. The monitoring configuration is numeral 121 and the adjacency matrix is numeral 131.

FIG. 17 is a diagram showing an adjacency matrix 171 in which component values corresponding to the switch group x in the adjacency matrix 151 are set to zero according to Embodiment 1. The leftmost items 172 and the uppermost items 173 of the distance matrix 171 indicate device names. A represents the server A, B the server B, x the switch group x, e the switch e, and P the monitoring apparatus 20. In the adjacency matrix 151, components corresponding to the switch group x are the shaded components FIG. 18 is a diagram showing a distance matrix 181 determined from the adjacency matrix 171 according to Embodiment 1. The leftmost items 182 and the uppermost items 183 of the distance matrix 181 indicate device names. A represents the server A, B the server B, x the switch group x, e the switch e, and P the monitoring apparatus 20.

The filtering target device identification unit 16 starts processing from Step S141. In Step S141, the filtering target device identification unit 16 sets the components of the switch group x corresponding to the maintenance target device to zero in the adjacency matrix 151. The adjacency matrix results in the matrix indicated by numeral 171. The processing proceeds to Step S142. In Step S142, the filtering target device identification unit 16 calculates the distance matrix 181 from the adjacency matrix 171, and then the processing proceeds to Step S143.

In Step S143, the filtering target device identification unit 16 refers to the distance matrix 181. Components in the distance matrix 181 that are all zero correspond to the components in terms of the server A and the server B besides the switch group x. Since the server B is already included as the filtering target device in the maintenance information, the filtering target device identification unit 16 adds the server A as the filtering target device in the maintenance information, and then the processing is terminated.

Figures 19, 20:
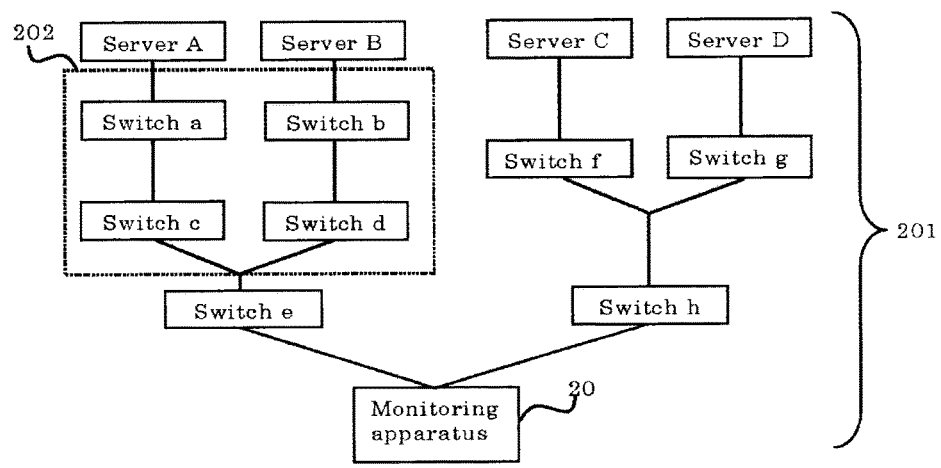
FIG. 19 is a diagram showing the maintenance management table output from the filtering target device identification unit according to Embodiment 1.
FIG. 20 is a diagram showing a monitoring configuration including a switch group x according to Embodiment 1.

FIG. 19 is a diagram showing a maintenance management table 191 output from the filtering target device identification unit 16 according to Embodiment 1. The maintenance management table 191 is a table generated by adding filtering target devices to the maintenance information management table 81 output from the maintenance information management unit 14.

The filtering target device identification unit 16 outputs, to the monitoring apparatus 20, the maintenance information management table 191 in which filtering target devices are added. The monitoring apparatus 20 receives the maintenance information management table 191. For example, during the maintenance time of the maintenance information 192a, the monitoring apparatus 20 filters alarms regarding the server A and the server B that are the filtering target devices. Because it is considered that the alarms regarding the server A and the server B are generated under the influence of the maintenance of the switch a.

In the present embodiment, when identifying maintenance target devices that are subject to maintenance in an information system realized by connecting a plurality of devices including monitoring target devices, the maintenance target device identification unit 15 identifies maintenance target devices on the basis of contents of configuration information in the information system or contents of maintenance target device information. The filtering target device identification unit 16 identifies filtering target devices to be affected by the maintenance of the maintenance target devices on the basis of a distance matrix calculated from an adjacency matrix obtained from the configuration information. Therefore, whether the maintenance target devices are recognized or not, filtering target devices that are to be affected by the maintenance can be identified. By filtering alarms regarding the filtering target device, unnecessary alarms are reduced, so that the working efficiency of monitoring staff can be increased.

Embodiment 2

In Embodiment 1 described above, whether maintenance target devices are recognized or not, filtering target devices to be affected by maintenance can be identified. However, the present embodiment is shown in which, in a case where locations of maintenance devices are unknown or maintenance devices are not included in a configuration, devices identified as the filtering target devices vary depending on a range where the configuration is precisely recognized even if devices and their connection inputted as configuration information are the same.

In the case of a real configuration, real configuration information is input to the configuration information management unit 12 and is input to the maintenance target device identification unit 15 from the configuration information management unit 12. In the case of a monitoring configuration, monitoring configuration information is input to the monitoring configuration information management unit 13 and is input to the maintenance target device identification unit 15 from the monitoring configuration information management unit 13. If information that indicates a range where the configuration is precisely recognized is input as part of the real configuration information or the monitoring configuration information, the maintenance target device identification unit 15 can limit an estimation range for the maintenance target devices.

FIG. 20 is a diagram showing a monitoring configuration 201 including the switch group x according to Embodiment 1. The server A connects with the switch a. The switch a connects with the switch c. The server B connects with the switch b. The switch b connects with the switch d. The switch c and the switch d connect with the switch e. A server C connects with a switch f. A server D connects with a switch g. The switch f and the switch g connect with a switch h. The switch e and the switch h connect with the monitoring apparatus 20.

In the monitoring configuration 201, it is assumed that whether the configuration between the server A and the switch e, and the server B and the switch e is precisely recognized or not is unknown. It is assumed that the configuration between the server C and the switch h, and the server D and the switch h is precisely recognized. The maintenance target device identification unit 15 limits the estimation range for the maintenance target devices to the range 202 that is encircled by a dotted line and includes the switch a, the switch b, the switch c, and the switch d. The maintenance target device identification unit 15 recognizes the devices included in the range 202 as the switch group x and identifies the switch group x as the maintenance target devices.

FIG. 21 is a diagram showing an adjacency matrix 211 for the monitoring configuration 201 including the switch group x according to Embodiment 1. In the adjacency matrix 211, the leftmost items 212 and the uppermost items 213 of the adjacency matrix 211 indicate device names. In the device names, A represents the server A, B the server B, C the server C, D the server D, x the switch group x, e the switch e, f the switch f, g the switch g, h the switch h, and P the monitoring apparatus 20.

Setting components corresponding to the switch group x to zero in the adjacency matrix 211, the filtering target device identification unit 16 determines a distance matrix, which results in a distance matrix 221 shown in FIG. 22.

FIG. 22 is a diagram showing the distance matrix 221 determined from the adjacency matrix 211 according to Embodiment 1. The leftmost items 222 and the uppermost items 223 of the distance matrix 221 indicate device names. A represents the server A, B the server B, C the server C, D the server D, x the switch group x, e the switch e, f the switch f, g the switch g, h the switch h, and P the monitoring apparatus 20.

In the distance matrix 221, components corresponding to the server A and the server B besides the switch group x are zero. Thus it is understood that the server A and the server B cannot connect with the other devices by maintenance. Therefore, the filtering target device identification unit 16 identifies the server A and the server B as the filtering target devices. If the server A and the server B are not included in the maintenance information, the filtering target device identification unit 16 adds them and outputs the maintenance information.

Figure 23:
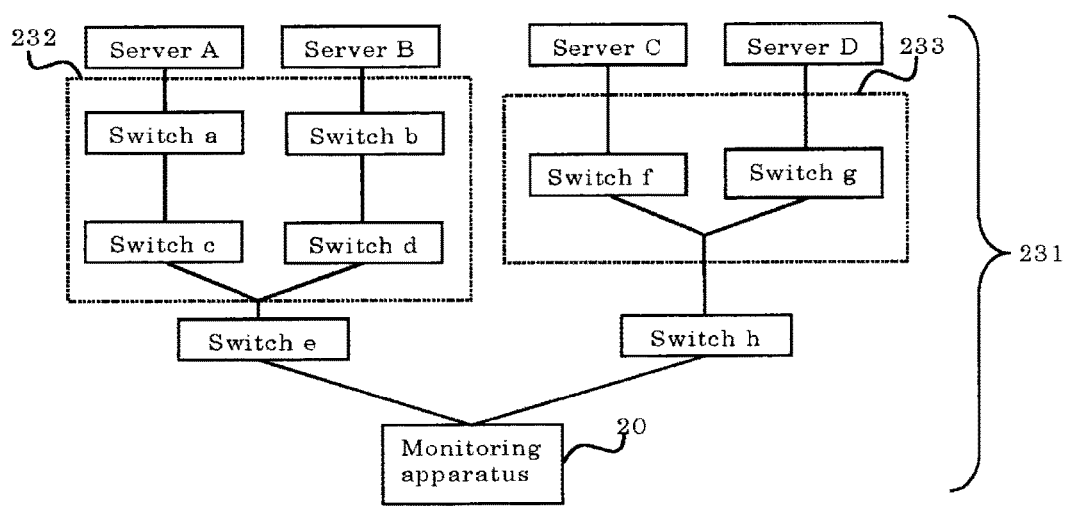
FIG. 23 is a diagram showing a monitoring configuration including a switch group x1 and a switch group x2 according to Embodiment 1.

Another example is shown below. FIG. 23 is a diagram showing a monitoring configuration 231 including a switch x1 and a switch x2 according to Embodiment 1. The devices constituting the monitoring configuration 231 and their connection are the same as those in the monitoring configuration 201. In the monitoring configuration 231, it is assumed that whether the configuration between the server A and the switch e, and the server B and the switch e is precisely recognized or not is unknown. Further, in the monitoring configuration 231, it is assumed that whether the configuration between the server C and the server D, and the switch h is precisely recognized or not is unknown. Still further, it is assumed that the portion between the server A and the server B, and the switch e and the portion between the server C and the server D, and the switch h, are known to be not connected with each other.

In the case of the monitoring configuration 231, the maintenance target device identification unit 15 can limit the estimation range for the maintenance target devices to two ranges 232 and 233. The range 232 is a range that is encircled by a dotted line and includes the switch a, the switch b, the switch c and the switch d. The range 233 is a range that is encircled by a dotted line and includes the switch f and the switch g. The maintenance target device identification unit 15 recognizes devices included in the range 232 as a switch group x1 and devices included in the range 233 as a switch group x2, and identifies those switch groups as the maintenance target devices.

FIG. 24 is a diagram showing an adjacency matrix 241 for the monitoring configuration 231 including the switch group x1 and the switch group x2 according to Embodiment 1. In the adjacency matrix 241, the leftmost items 242 and the uppermost items 243 of the adjacency matrix 241 indicate device names. In the device names, A represents the server A, B the server B, C the server C, D the server D, x1 the switch group x1, e the switch e, x2 the switch group x2, h the switch h, and P the monitoring apparatus 20.

Setting components corresponding to the switch groups x1 and x2 to zero in the adjacency matrix 241, the filtering target device identification unit 16 determines a distance matrix, which results in a distance matrix 251 shown in FIG. 25.

FIG. 25 is a diagram showing the distance matrix 251 determined from the adjacency matrix 241 according to Embodiment 1. The leftmost items 252 and the uppermost items 253 of the distance matrix 251 indicate device names. A represents the server A, B the server B, C the server C, D the server D, x1 the switch group x1, e the switch e, x2 the switch group x2, h the switch h and P the monitoring apparatus 20.

In the distance matrix 251, components corresponding to the server A, the server B, the server C, and the server D besides the switch groups x1 and x2 are all zero. Thus it is understood that the server A, the server B, the server C, and the server D cannot connect with the other devices by maintenance. Therefore, the filtering target device identification unit 16 identifies the server A, the server B, the server C, and the server D as the filtering target devices. If the server A, the server B, the server C, and the server D are not included in the maintenance information, the filtering target device identification unit 16 adds them and outputs the maintenance information.

As described above, even in a case where constituting devices and their connection are the same, devices that are identified as filtering target devices are different depending on a range where the configuration is precisely identified.

In the present embodiment, when identifying maintenance target devices that are subject to maintenance in an information system realized by connecting a plurality of devices including monitoring target devices, the maintenance target device identification unit 15 identifies maintenance target devices on the basis of contents of configuration information in the information system or contents of maintenance target device information. The filtering target device identification unit 16 identifies filtering target devices to be affected by the maintenance of the maintenance target devices on the basis of a distance matrix calculated from an adjacency matrix obtained from the configuration information. Therefore, whether the maintenance target devices are recognized or not, filtering target devices that are to be affected by the maintenance can be identified. By filtering alarms regarding the filtering target device, unnecessary alarms are reduced, so that the working efficiency of monitoring staff can be increased.

EXPLANATION OF REFERENCE NUMERALS 11 monitoring control apparatus
12 configuration information management unit
13 maintenance information management unit
14 monitoring configuration information management unit
15 maintenance device identification unit
16 filtering device identification unit
20 monitoring apparatus
21a-c information systems
22 real configuration
23 server
24 switch
31 real configuration information management table
32, 62 device names
33, 63 connected device names
41, 71, 111, 131, 151, 171, 211, 241 adjacency matrices
42, 43, 72, 73, 112, 113, 132, 133, 152, 153, 162, 163, 172, 173, 182, 183, 212,
213, 222, 223, 242, 243, 252, 253 items
51, 121, 201, 231 monitoring configurations 61 monitoring configuration information management table
81, 191 maintenance information management tables
82 maintenance target device
83 filtering target device
84 maintenance time
85a-c, 192a-c maintenance information
161, 181, 221, 251 distance matrices
202, 232, 233 ranges

The invention claimed is:

1. A monitoring control apparatus comprising:
a maintenance target device identification unit that identifies, on the basis of contents of configuration information in an information system or contents of maintenance target device information, a maintenance target device subject to maintenance in the information system realized by connecting a plurality of devices including a monitoring target device; and
a filtering target device identification unit that (i) obtains an adjacency matrix from the configuration information, (ii) calculates a distance matrix from the obtained adjacency matrix, (iii) identifies a filtering target device to be affected by the maintenance of the identified maintenance target device on the basis of the calculated distance matrix, and (iv) outputs the identified filtering target device to a monitoring apparatus that monitors the identified monitoring target device.

2. The monitoring control apparatus according to claim 1, wherein the maintenance target device identification unit identifies, as maintenance target devices, a device group including one or more devices between the monitoring target device and the monitoring apparatus that monitors the monitoring target device, if no maintenance target devices are included in the configuration information.

3. The monitoring control apparatus according to claim 2, wherein the filtering target device identification unit calculates the distance matrix from adjacency matrix obtained from the configuration information in which components corresponding to the identified maintenance target device of the adjacency matrix obtained from the configuration information are set to zero, and identifies, as the filtering target device, a device in which the components in the distance matrix are all zero.

4. The monitoring control apparatus according to claim 3, further comprising:
a configuration information controller that generates, if real configuration information on the information system is input, a first adjacency matrix indicating adjacency relation of devices on the basis of the real configuration information, and outputs the first adjacency matrix to the maintenance target device identification unit;
a monitoring configuration information controller to which monitoring configuration information including the monitoring target device is input, and that generates a second adjacency matrix indicating adjacency relation of devices on the basis of the monitoring configuration information, and outputs the second adjacency matrix to the maintenance target device identification unit; and
a maintenance information controller to which maintenance information including a maintenance target device, a filtering target device, and maintenance time is input, and that stores the maintenance information in a maintenance information management table, and outputs the maintenance information management table to the maintenance target device identification unit and the filtering target device identification unit,
wherein the maintenance target device identification unit uses the first adjacency matrix as the configuration information if the first adjacency matrix generated on the basis of the real configuration information from the configuration information controller is input, and uses, as the configuration information, the second adjacency matrix that is generated on the basis of the monitoring information input from the monitoring configuration information controller if the first adjacency matrix is not input from the configuration information controller.

5. The monitoring control apparatus according to claim 2, further comprising:
a configuration information controller that generates, if real configuration information on the information system is input, a first adjacency matrix indicating adjacency relation of devices on the basis of the real configuration information, and outputs the first adjacency matrix to the maintenance target device identification unit;
a monitoring configuration information controller to which monitoring configuration information including the monitoring target device is input, and that generates a second adjacency matrix indicating adjacency relation of devices on the basis of the monitoring configuration information, and outputs the second adjacency matrix to the maintenance target device identification unit; and
a maintenance information controller to which maintenance information including a maintenance target device, a filtering target device, and maintenance time is input, and that stores the maintenance information in a maintenance information management table, and outputs the maintenance information management table to the maintenance target device identification unit and the filtering target device identification unit,
wherein the maintenance target device identification unit uses the first adjacency matrix as the configuration information if the first adjacency matrix generated on the basis of the real configuration information from the configuration information controller is input, and uses, as the configuration information, the second adjacency matrix that is generated on the basis of the monitoring information input from the monitoring configuration information controller if the first adjacency matrix is not input from the configuration information controller.

6. The monitoring control apparatus according to claim 1, wherein the maintenance target device identification unit identifies, as maintenance target devices, a device group including one or more devices between the monitoring target device and the monitoring apparatus that monitors the monitoring target device, if no maintenance target devices are known.

7. The monitoring control apparatus according to claim 6 wherein the filtering target device identification unit calculates the distance matrix from the adjacency matrix obtained from the configuration information in which components corresponding to the identified maintenance target device of the adjacency matrix obtained from the configuration information are set to zero, and identifies, as the filtering target device, a device in which the components in the distance matrix are all zero.

8. The monitoring control apparatus according to claim 7, further comprising:
a configuration information controller that generates, if real configuration information on the information system is input, a first adjacency matrix indicating adjacency relation of devices on the basis of the real configuration information, and outputs the first adjacency matrix to the maintenance target device identification unit;

a monitoring configuration information controller to which monitoring configuration information including the monitoring target device is input, and that generates a second adjacency matrix indicating adjacency relation of devices on the basis of the monitoring configuration information, and outputs the second adjacency matrix to the maintenance target device identification unit; and a maintenance information controller to which maintenance information including a maintenance target device, a filtering target device, and maintenance time is input, and that stores the maintenance information in a maintenance information management table, and outputs the maintenance information management table to the maintenance target device identification unit and the filtering target device identification unit, wherein the maintenance target device identification unit uses the first adjacency matrix as the configuration information if the first adjacency matrix generated on the basis of the real configuration information from the configuration information controller is input, and uses, as the configuration information, the second adjacency matrix that is generated on the basis of the monitoring information input from the monitoring configuration information controller if the first adjacency matrix is not input from the configuration information controller.

9. The monitoring control apparatus according to claim 6, further comprising:

a configuration information controller that generates, if real configuration information on the information system is input, a first adjacency matrix indicating adjacency relation of devices on the basis of the real configuration information, and outputs the first adjacency matrix to the maintenance target device identification unit;

a monitoring configuration information controller to which monitoring configuration information including the monitoring target device is input, and that generates a second adjacency matrix indicating adjacency relation of devices on the basis of the monitoring configuration information, and outputs the second adjacency matrix to the maintenance target device identification unit; and a maintenance information controller to which maintenance information including a maintenance target device, a filtering target device, and maintenance time is input, and that stores the maintenance information in a maintenance information management table, and outputs the maintenance information management table to the maintenance target device identification unit and the filtering target device identification unit, wherein the maintenance target device identification unit uses the first adjacency matrix as the configuration information if the first adjacency matrix generated on the basis of the real configuration information from the configuration information controller is input, and uses, as the configuration information, the second adjacency matrix that is generated on the basis of the monitoring information input from the monitoring configuration information controller if the first adjacency matrix is not input from the configuration information controller.

10. The monitoring control apparatus according to claim 1, wherein the maintenance target device identification unit identifies, as maintenance target devices, a device group including one or more devices between the monitoring target device and the monitoring apparatus that monitors the monitoring target device, if no maintenance target devices are included in the maintenance target device information.

11. The monitoring control apparatus according to claim 10, wherein the filtering target device identification unit calculates the distance matrix from the adjacency matrix obtained from the configuration information in which components corresponding to the identified maintenance target device of the adjacency matrix obtained from the configuration information are set to zero, and identifies, as the filtering target device, a device in which the components in the distance matrix are all zero.

12. The monitoring control apparatus according to claim 11, further comprising:

a configuration information controller that generates, if real configuration information on the information system is input, a first adjacency matrix indicating adjacency relation of devices on the basis of the real configuration information, and outputs the first adjacency matrix to the maintenance target device identification unit;

a monitoring configuration information controller to which monitoring configuration information including the monitoring target device is input, and that generates a second adjacency matrix indicating adjacency relation of devices on the basis of the monitoring configuration information, and outputs the second adjacency matrix to the maintenance target device identification unit; and a maintenance information controller to which maintenance information including a maintenance target device, a filtering target device, and maintenance time is input, and that stores the maintenance information in a maintenance information management table, and outputs the maintenance information management table to the maintenance target device identification unit and the filtering target device identification unit, wherein the maintenance target device identification unit uses the first adjacency matrix as the configuration information if the first adjacency matrix generated on the basis of the real configuration information from the configuration information controller is input, and uses, as the configuration information, the second adjacency matrix that is generated on the basis of the monitoring information input from the monitoring configuration information controller if the first adjacency matrix is not input from the configuration information controller.

13. The monitoring control apparatus according to claim 10, further comprising:

a configuration information controller that generates, if real configuration information on the information system is input, a first adjacency matrix indicating adjacency relation of devices on the basis of the real configuration information, and outputs the first adjacency matrix to the maintenance target device identification unit;

a monitoring configuration information controller to which monitoring configuration information including the monitoring target device is input, and that generates a second adjacency matrix indicating adjacency relation of devices on the basis of the monitoring configuration information, and outputs the second adjacency matrix to the maintenance target device identification unit; and a maintenance information controller to which maintenance information including a maintenance target device, a filtering target device, and maintenance time is input, and that stores the maintenance information in a maintenance information management table, and outputs the maintenance information management table to the maintenance target device identification unit and the filtering target device identification unit, wherein the maintenance target device identification unit uses the first adjacency matrix as the configuration information if the first adjacency matrix generated on the basis of the real configuration information from the configuration information controller is input, and uses, as the configuration information, the second adjacency matrix that is generated on the basis of the monitoring information input from the monitoring configuration information controller if the first adjacency matrix is not input from the configuration information controller.

14. The monitoring control apparatus according to claim 1, wherein the filtering target device identification unit calculates the distance matrix from the adjacency matrix obtained from the configuration information in which components corresponding to the identified maintenance target device of the adjacency matrix obtained from the configuration information are set to zero, and identifies, as the filtering target device, a device in which the components in the distance matrix are all zero.

15. The monitoring control apparatus according to claim 14, further comprising:
    a configuration information controller that generates, if real configuration information on the information system is input, a first adjacency matrix indicating adjacency relation of devices on the basis of the real configuration information, and outputs the first adjacency matrix to the maintenance target device identification unit;
    a monitoring configuration information controller to which monitoring configuration information including the monitoring target device is input, and that generates a second adjacency matrix indicating adjacency relation of devices on the basis of the monitoring configuration information, and outputs the second adjacency matrix to the maintenance target device identification unit; and
    a maintenance information controller to which maintenance information including a maintenance target device, a filtering target device, and maintenance time is input, and that stores the maintenance information in a maintenance information management table, and outputs the maintenance information management table to the maintenance target device identification unit and the filtering target device identification unit,
    wherein the maintenance target device identification unit uses the first adjacency matrix as the configuration information if the first adjacency matrix generated on the basis of the real configuration information from the configuration information controller is input, and uses, as the configuration information, the second adjacency matrix that is generated on the basis of the monitoring information input from the monitoring configuration information controller if the first adjacency matrix is not input from the configuration information controller.

16. The monitoring control apparatus according to claim 1, further comprising:
    a configuration information controller that generates, if real configuration information on the information system is input, a first adjacency matrix indicating adjacency relation of devices on the basis of the real configuration information, and outputs the first adjacency matrix to the maintenance target device identification unit;
    a monitoring configuration information controller to which monitoring configuration information including the monitoring target device is input, and that generates a second adjacency matrix indicating adjacency relation of devices on the basis of the monitoring configuration information, and outputs the second adjacency matrix to the maintenance target device identification unit; and
    a maintenance information controller to which maintenance information including a maintenance target device, a filtering target device, and maintenance time is input, and that stores the maintenance information in a maintenance information management table, and outputs the maintenance information management table to the maintenance target device identification unit and the filtering target device identification unit,
    wherein the maintenance target device identification unit uses the first adjacency matrix as the configuration information if the first adjacency matrix generated on the basis of the real configuration information from the configuration information controller is input, and uses, as the configuration information, the second adjacency matrix that is generated on the basis of the monitoring information input from the monitoring configuration information controller if the first adjacency matrix is not input from the configuration information controller.

17. A monitoring control method comprising steps of:
    identifying, on the basis of contents of configuration information in an information system or contents of maintenance target device information, a maintenance target device that is subject to maintenance in the information system realized by connecting a plurality of devices including a monitoring target device;
    obtaining an adjacency matrix from the configuration information;
    calculating a distance matrix from the obtained adjacency matrix;
    identifying a filtering target device to be affected by the maintenance of the maintenance identified target device on the basis of the calculated distance matrix; and
    outputting the identified filtering target device to a monitoring apparatus that monitors the identified monitoring target device.

* * * * *